US012762384B1

(12) United States Patent
Kannan et al.

(10) Patent No.: US 12,762,384 B1

(45) Date of Patent: Oct. 13, 2026

(54) LAYER-BASED SPILLING

(71) Applicant: Amazon Technologies, Inc., Seattle, WA (US)

(72) Inventors: Parivallal Kannan, San Jose, CA (US); Hongbin Zheng, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 789 days.

(21) Appl. No.: 18/194,561

(22) Filed: Mar. 31, 2023

(51) Int. Cl.
*G06N 3/0499* (2023.01)
*G06F 8/41* (2018.01)

(52) U.S. Cl.
CPC ........... *G06N 3/0499* (2023.01); *G06F 8/433* (2013.01); *G06F 8/443* (2013.01)

(58) Field of Classification Search
CPC ........ G06N 3/0499; G06F 8/433; G06F 8/443
See application file for complete search history.

(56) References Cited

U.S. PATENT DOCUMENTS

| | | | | |
|---|---|---|---|---|
| 11,144,291 | B1 * | 10/2021 | Zheng | G06F 8/433 |
| 12,423,007 | B1 * | 9/2025 | Ravishankar | G06N 5/02 |
| 2019/0391796 | A1 * | 12/2019 | Brady | G06F 8/458 |
| 2020/0004514 | A1 * | 1/2020 | Yu | G06N 3/08 |
| 2021/0158131 | A1 * | 5/2021 | Jain | G06N 3/063 |
| 2022/0101110 | A1 * | 3/2022 | Sakharshete | G06N 3/063 |
| 2022/0138580 | A1 * | 5/2022 | Imai | G06N 3/045 706/25 |
| 2023/0259486 | A1 * | 8/2023 | Han | G06N 3/098 712/30 |
| 2024/0135510 | A1 * | 4/2024 | Liu | G06V 10/945 |
| 2024/0272791 | A1 * | 8/2024 | Cho | G06F 3/0629 |
| 2024/0338558 | A1 * | 10/2024 | Ling | G06N 3/08 |

OTHER PUBLICATIONS

"Tensor processing primitives: programming abstraction for efficiency and portability in deep learning workloads", Georganas et al., Nov. 14, 2021 (Year: 2021).*

* cited by examiner

*Primary Examiner* — Daxin Wu
(74) *Attorney, Agent, or Firm* — Weaver Austin Villeneuve & Sampson LLP

(57) ABSTRACT

Techniques for reducing compilation time of a neural network model can include identifying boundary markers in a representation of the neural network model to determine proxy layers in the neural network model. A tensor that is used in a first proxy layer and is used next in a second proxy layer separated from the first proxy layer by at least a threshold distance can be identified, and a spilling operation can be inserted for the tensor to remove the tensor from a memory allocation process. A memory allocator can then be invoked to perform the memory allocation process without the tensor associated with the inserted spilling operation.

20 Claims, 10 Drawing Sheets

LAYER-BASED SPILLING

BACKGROUND

Machine learning utilizes neural network models to perform complex tasks such as image recognition and natural language processing, among others. A neural network can be represented using a data flow graph that includes different types of operations to be performed on an input data set. The operations may include computations, data reshaping operations, memory accesses, and/or other operations. A compiler can be used to generate machine level instructions based on the data flow graph, which can be executed by a computing device to generate output data based on the input data set.

BRIEF DESCRIPTION OF THE DRAWINGS

Various embodiments in accordance with the present disclosure will be described with reference to the drawings, in which.

DETAILED DESCRIPTION

Figure 1:
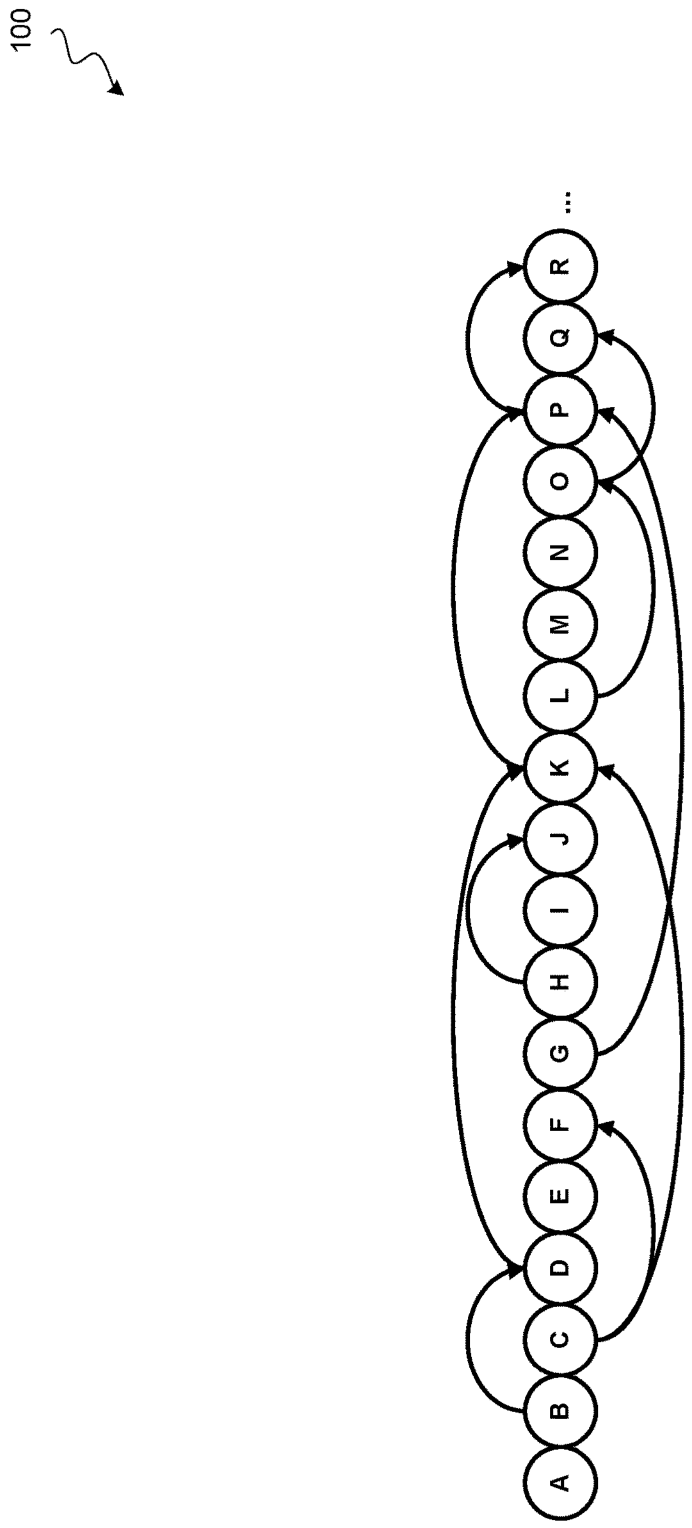
FIG. 1 shows an example of a data flow graph for a neural network model.

The application of machine learning to ever more complex tasks has led to neural network models expanding in both complexity and size. As a result, the buffer memory capacity of most accelerators is typically not sufficient to fit the entire model data and activations that are generated during runtime. During the compilation of a neural network model, a memory allocator can be invoked to assign memory locations in the accelerator's buffer memory. The memory locations are used to store tensors representing the model data and activations utilized during execution of the neural network model. At certain points during runtime execution, the buffer memory may not be able to accommodate all the tensors that are live. As such, the memory allocator can spill some tensors to host memory and reload them at a later point in time when they are needed. However, with the large number of tensors being utilized in complex neural network models, the memory allocation process can take up a significant amount of the compilation time.

To improve the compilation time and reduce the burden on the memory allocator, the techniques described herein can be used to pre-spill tensors prior to invoking the memory allocator. Neural network models typically include some tensors that are reused during execution of the neural network. For example, the same tensor can be generated during a forward pass and then later reused during a backward pass of a training process. Such tensors can have a long live range from when the tensor is generated to when the tensor is next used. The techniques disclosed herein can be used to identify such tensors in a pre-scheduler before invoking a memory allocator. By pre-spilling selected tensors before invoking the memory allocator, the number of interferences between memory objects (e.g., tensors) that the memory allocator has to resolve can be reduced to yield a faster compilation time.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A neural network model can be described using a high-level programming language, such as Java, C++, R, Go, Python, or Tensorflow, etc. The neural network model can be processed by a compiler to generate machine level instructions that can be executed by an accelerator such as a neural network processor to generate output data based on an input dataset. The input dataset, the output data, and any intermediate data generated by the neural network model can be represented using tensors. The input dataset may correspond to an image, a text, an audio, or a video that needs to be operated on. The compiler can process the neural network model over multiple stages, which may include generating an intermediate representation (IR) of the neural network model based on the programming code of the model, performing hardware agnostic optimizations on the IR to generate a modified IR, performing hardware-specific optimizations on the modified IR for the given hardware architecture, and generating the machine level instructions for the given hardware architecture.

In some implementations, the intermediate representation (e.g., in the form of IR instructions) of the neural network model can represent a data flow graph. The data flow graph may include nodes and edges connecting the nodes. The nodes may represent operators such as computations, data rearrangements, and/or other operations; and the edges or connections between the nodes may represent dependencies between the nodes, such as data dependencies. Some of the operators in the data flow graph can be computational operators such as element-wise unary operators (e.g., data-type casting, inversion, bit-shift, etc.), element-wise binary operators (e.g., logical operations such as AND, OR, XOR, etc.; algebraic operations such as addition, subtraction, etc.), matrix multiplication, convolution, batch normalization operators, collective compute operators (e.g., all-reduce, all-gather, etc.), or other computational neural network operators. Some of the operators in the data flow graph can be data rearrangement operators such as broadcast, reshape, transpose, split, concatenate, etc.

FIG. 1 illustrates an example of a data flow graph 100 representing a neural network model. The data flow graph can be an intermediate representation (e.g., in the form of IR instructions) of the neural network model generated from the source code of the neural network model in the frontend processing of the compiler, and may have undergone various optimizations steps in the middle-end processing of the compiler. At the stage of the compilation process shown in FIG. 1, the loop nests in the code may have been unrolled, and thus the instructions in the IR have been flattened and can be represented as a straight-line sequence. Each node in data flow graph 100 (e.g., node A, node B, etc.) may represent an operator (e.g., any of the operator described above) in the sequence of execution. Edges (or arrows) connecting the nodes indicate a data dependence of a subsequent operation to an earlier operation. For example, the edge connecting node D from node B may indicate that the operation in node D uses a tensor generated by the operation in node B. Some tensors can be reused multiple times. For example, the tensor generated by node C is used in node C, node F, and node K. It should be understood that the data flow graph 100 shown in FIG. 1 is just a portion of a much bigger graph, and that a neural network model in some implementations may include thousands or even millions of operators and data dependencies.

Prior to invoking a memory allocator, the pre-scheduler of the compiler can analyze the data flow graph to determine if any tensors are suitable for spilling. By pre-spilling the tensors at this stage of the compiler before invoking the memory allocator, subsequent execution of the memory allocator can be completed much faster because the memory allocator will have less memory object interferences to resolve. For example, as part of the memory allocation process, the memory allocator may build an interference graph to represent the interferences of the live ranges of the tensors used in the neural network model. Reducing the number of interferences that the memory allocator has to operate on can shrink the interference graph to make it more manageable. Moreover, the median number of interferences of a tensor with other tensors (referred to as the degree of the tensor) can also be reduced to improve convergence time. In most cases, the memory allocation can be the most time-consuming phase of the compilation process. Thus, by reducing the execution time of the memory allocator, a significant improvement in the overall compilation time can be achieved.

To identify candidate tensors for pre-spilling, boundary markers in the data flow graph can be identified to determine proxy layers in the neural network model. Boundary markers may refer to operators that indicate a synchronization event or a completion of certain stages of computations. For example, a boundary marker can be a collective compute operation (e.g., all-reduce, all-gather, reduce-scatter, etc.) to synchronize model parameters (e.g., weights, gradients) or other data across processing nodes, and/or a batch normalization operator to complete computations on a batch of data. In some implementations, a boundary marker can also be a boundary tag that is inserted by the user (e.g., neural network architect) or by the neural network development framework. Such boundary markers can be tags that are inserted, for example, for the framework to recognize the boundaries of loopnests, repeating patterns, or other structural boundaries.

The location of the boundary markers can mark the boundaries of proxy layers in the neural network model. A proxy layer may refer to a series of operators that are used to generate a tensor. The proxy layer boundaries may or may not align with the layers of the neural network, and hence they are referred to as proxy layers. Some proxy layers can be embedded within a neural network layer, and can be a sub-layer of the neural network layer. In certain types of neural network models such as transformer models, multiple proxy layers can have a common sequence of operators, which typically end with a collective compute operator or batch normalization operator. Hence, these types of operators, as well as those inserted to mark structural boundaries, can be used to locate the proxy layers in a neural network model.

Figure 2:
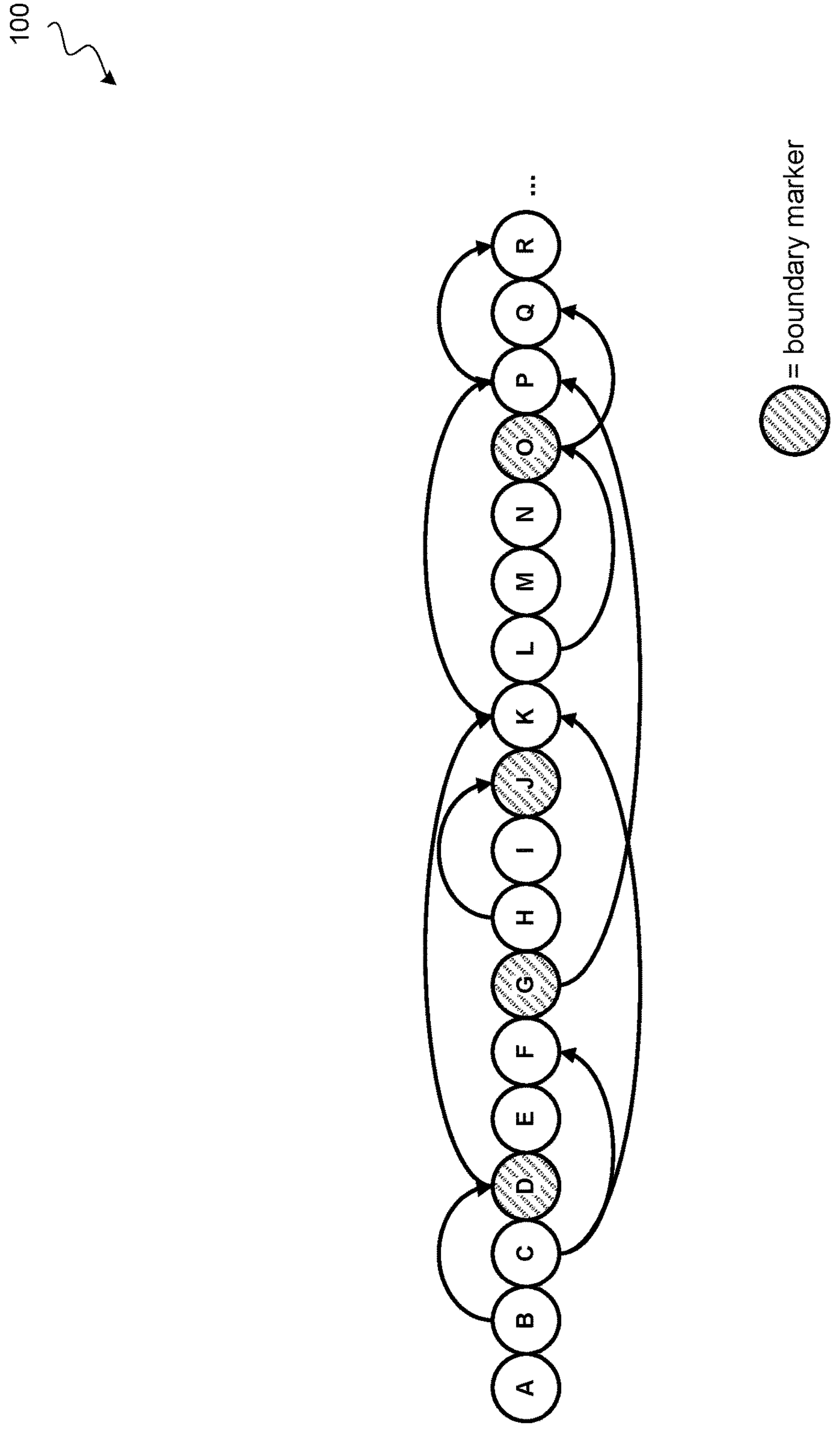
FIG. 2 shows an example of identifying boundary markers in a data flow graph.

FIG. 2 illustrates an example of identifying boundary markers in the data flow graph 100. In the example shown, each of node D, node G, node J, and node O may represent a boundary marker operation. For example, each of these nodes can be, for example, a collective compute operation or a batch normalization operation. The boundary makers are shown with a diagonal fill pattern in FIG. 2. The boundary markers can be used to identify the proxy layers in the data flow graph 100.

Figure 3:
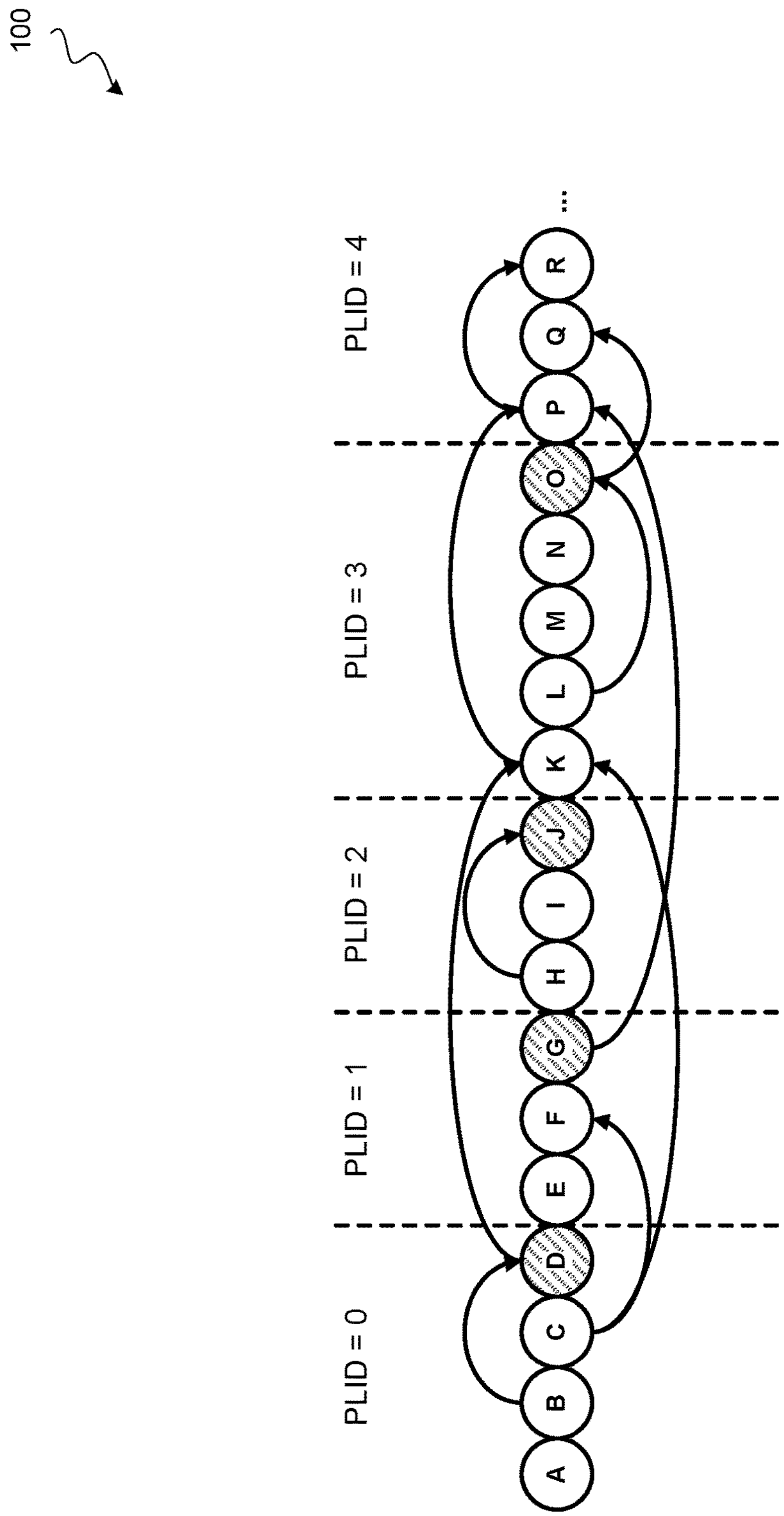
FIG. 3 shows an example of assigning layer identifiers in a data flow graph.

Upon determining the location of the proxy layers based on the boundary markers, layer identifiers (IDs) can be assigned to the individual proxy layers that each end with a boundary marker. The layer IDs can be assigned sequentially to the proxy layers, and can be used as a metric to measure a distance between operators. FIG. 3 illustrates an example of assigning proxy layer IDs (PLIDs) in the data flow graph 100. As shown in FIG. 3, the proxy layer ending with node D can be assigned a PLID of 0, and each of nodes A, B, C, and D is associated with PLID=0. The proxy layer ending with node G can be assigned a PLID of 1, and each of nodes E, F, and G is associated with PLID=1. The proxy layer ending with node J can be assigned a PLID of 2, and each of nodes H, I, and J is associated with PLID=2. The proxy layer ending with node O can be assigned a PLID of 3, and each of nodes K, L, M, N, and O is associated with PLID=3. The next proxy layer can be assigned a PLID of 4, and each of nodes P, Q, R, and other nodes including the next boundary marker is associated with PLID=4, and so on.

Next, long-distance tensors that are used in proxy layers separated by at least a threshold number of proxy layers can be determined. These long-distance tensors can be good candidates for pre-spilling because they are likely to be spilled anyway by the memory allocator. A long-distance tensor can be a tensor that is used multiple times, in which the operators involved in sequential uses of the tensor are spaced apart by a minimum distance. An operator uses a tensor if the operator generates the tensor, or if the operator operates on the tensor (e.g., tensor is an input to the operator).

Figure 4:
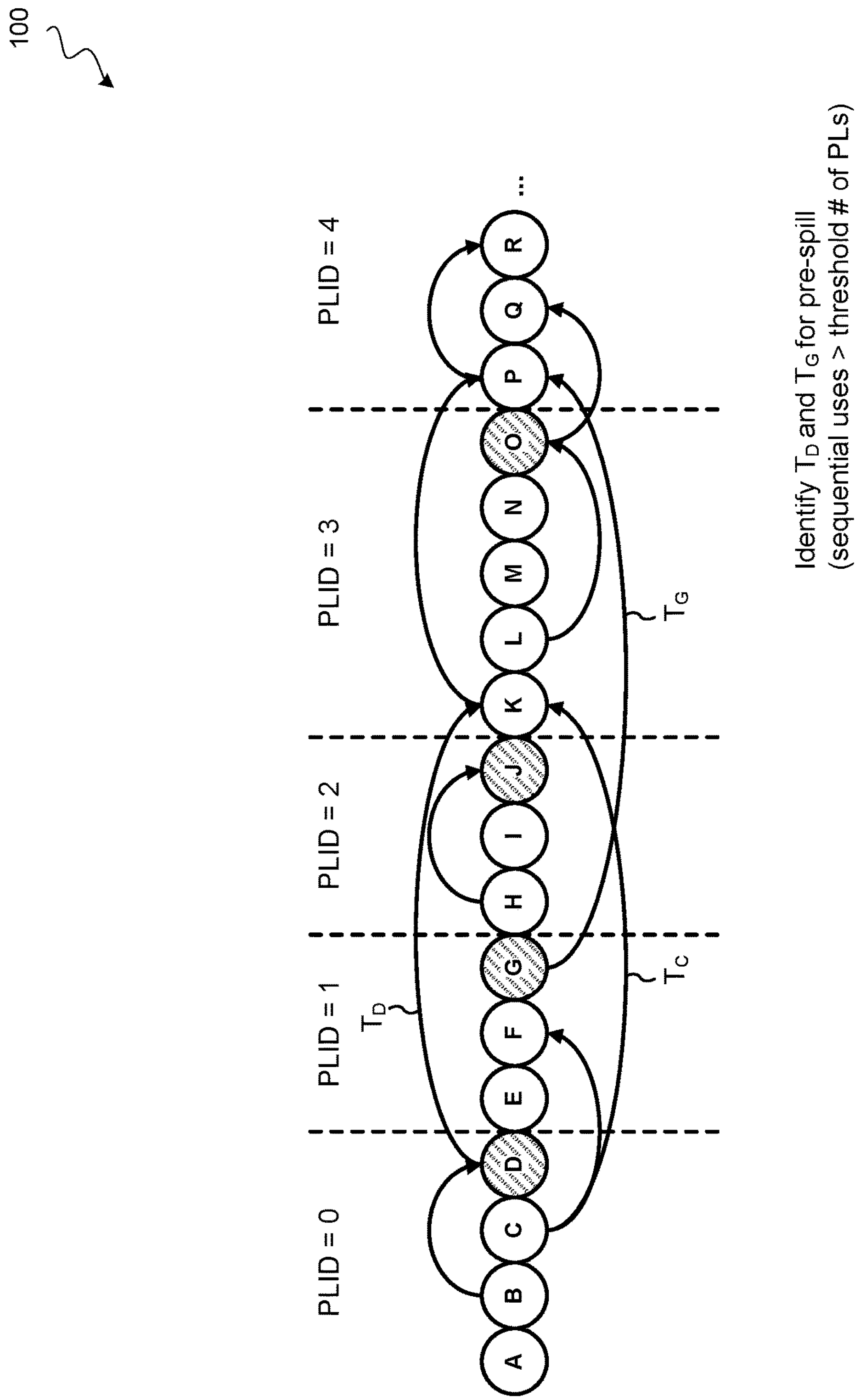
FIG. 4 shows an example of identifying tensors for pre-spilling in a data flow graph.

FIG. 4 illustrates an example of determining long-distance tensors in the data flow graph 100. In the example shown, a tensor is determined to be a long-distance tensor if sequential uses of the tensor are separated by at least two proxy layers (difference in PLIDs being greater than two). In other implementations the threshold number of proxy layers to qualify for a long-distance tensor can be a different value. A suitable threshold can be determined, for example, using heuristics. In some implementations, the threshold number of proxy layers can be configurable, and can be a user programmable compiler parameter when executing the compiler.

Referring to FIG. 4, the tensor $T_D$ is generated by node D in proxy layer 0, and is next used by node K in proxy layer 3. Node D and node K are separated by at least two proxy layers, and thus the tensor $T_D$ is considered a long-distance tensor. Similarly, the tensor TG is generated by node G in proxy layer 1, and is next used by node P in proxy layer 4. Node G and node P are separated by at least two proxy layers, and thus the tensor TG is also considered a long-distance tensor.

As another example, the tensor $T_C$ is generated by node C in proxy layer 0, and is used in both nodes F and node K. Even though the use of tensor $T_C$ at node K is at least two proxy layers from node C (difference in PLIDs being greater than two), the uses of tensor $T_C$ at node C and node K are not sequential uses because tensor $T_C$ is also used at node F. Node F is not spaced apart from node C by at least two proxy layers, and node K is not spaced apart from node F by at least two proxy layers. Accordingly, tensor $T_C$ is not considered to be a long-distance tensor for pre-spilling.

Upon identifying long-distance tensors for pre-spilling, spilling operations can be inserted into the data flow graph to remove the long-distance tensors from the subsequent memory allocation process. The spilling operations can be inserted into the data flow graph prior to invoking the memory allocator. In this manner, interferences of the long-distance tensors can be excluded from the interference graph generated by the memory allocator, and hence excluded from the memory allocation process.

Figure 5:
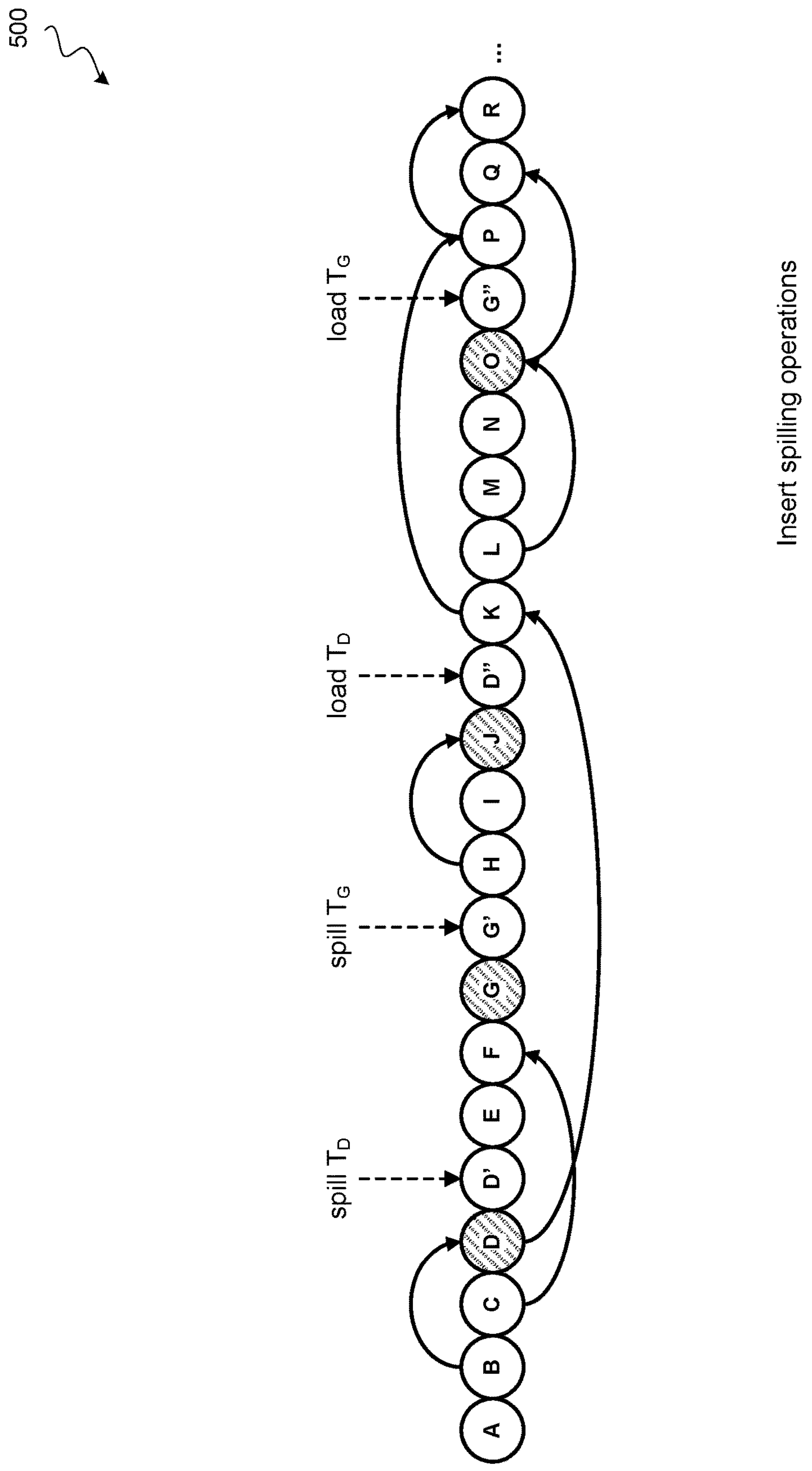
FIG. 5 shows an example of inserting spilling operations to generate a modified data flow graph.

FIG. 5 illustrates an example of inserting spilling operations (e.g., spill and load operations) into the data flow graph 100 for the long-distance tensors being pre-spilled to generate a modified data flow graph 500. The tensor $T_D$ is generated by node D and is next used by node K. Hence, a spill operation represented by node D' to spill the tensor $T_D$ to host memory can be inserted after node D, and a load operation represented by node D" to load the tensor TD from host memory can be inserted before node K to generate the modified data flow graph 500. The edge between node D and node K can be removed. Similarly, the tensor TG is generated by node G and is next used by node P. Hence, a spill operation represented by node G' to spill the tensor TG to host memory can be inserted after node G, and a load operation represented by node G" to load the tensor TG from host memory can be inserted before node P to generate the modified data flow graph 500. The edge between node G and node P can be removed. The modified data flow graph 500 can be provided as the input to the memory allocator.

It should be noted that a tensor that is used multiple times can have a portion of the live range be spilled while remaining usage of the tensor is retained in the modified data flow graph. In other words, replacement of an edge with spilling operations can be applied to some but not all edges of a tensor. In some implementations, a tensor that is used by many operators can also be excluded from pre-spilling, even though some of the sequential uses may satisfy the threshold distance. Such tensors can be excluded from pre-spilling because frequent spill operations can incur latencies that can impact performance of the neural network model.

Figure 6:
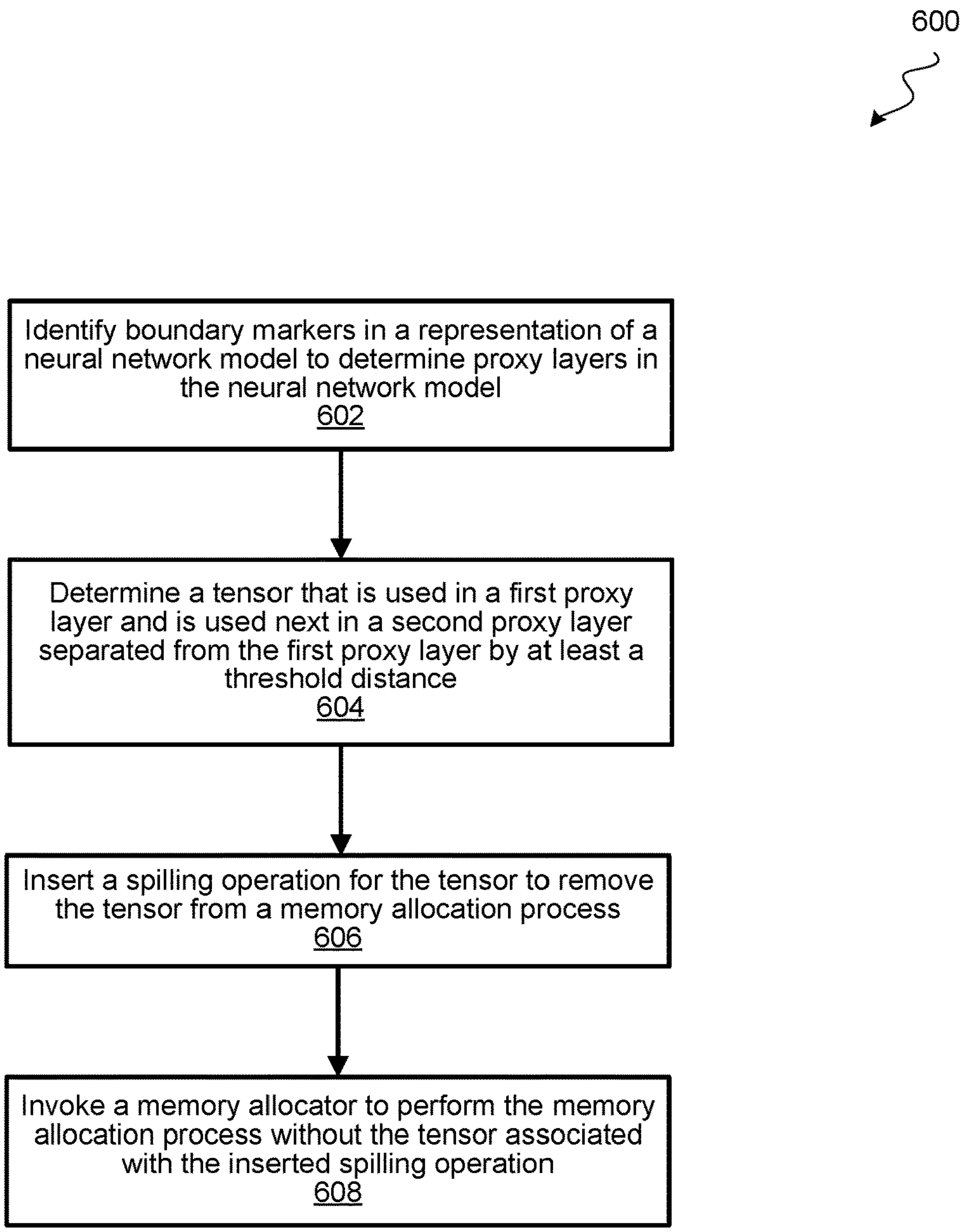
FIG. 6 shows a flow diagram of an example of a process to reduce compilation time.

FIG. 6 illustrates a flow diagram of an example of a process 600 for compiling a neural network model. Process 600 can be performed, for example, by a compiler that interprets programming code describing the neural network model, and translates the programming code into machine instructions for execution on hardware (e.g., an integrated circuit device such as a neural network accelerator or an acceleration engine). In some implementations, process 600 can be implemented on a computer-readable medium that is executable by one or more processors of a computing system to compile the programming code of a neural network model for loading onto the integrated circuit device for execution.

Process 600 may begin at block 602 by identifying boundary markers in a representation of a neural network model to determine proxy layers in the neural network model. In some implementations, the representation of the neural network model can be an intermediate representation (IR) generated by the compiler based on a description of a neural network model received by the compiler. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. In some implementations the neural network model can be a transformer model, which may include multiple repeating sequences of operators. The IR can represent a data flow graph having operators represented by nodes and data dependencies represented by edges connecting the nodes.

IR instructions or operators that correspond to collective compute operations and/or batch normalization operations can be identified as boundary markers. In some implementations, boundary tags inserted by the user or by the neural network development framework can also be identified as boundary markers. The boundary markers can be used to identify proxy layers in the neural network model. In some implementations, layer identifiers (e.g., PLIDs) can be assigned to the proxy layers. The layer identifiers can be used to compute a distance between the proxy layers.

At block 604, a tensor that is used in a first proxy layer and is used next in a second proxy layer separated from the first proxy layer by at least a threshold distance can be determined. By way of example, the first proxy layer can be in a forward pass of a training process, and the second proxy layer can be in a backward pass of the training process. The threshold distance can be measured as the number of proxy layers between sequential uses of the tensors. A tensor is used by an operator if the operator generates and/or operates on the tensor. In some implementations, the threshold distance can be configurable. A tensor having sequential uses satisfying the threshold distance can be a long-distance tensor that is suitable for pre-spilling before invoking a memory allocator.

At block 606, a spilling operation for the tensor determined in block 604 is inserted into the IR to remove the tensor from the subsequent memory allocation process. The spilling operation being inserted may include a spill operation to write the tensor to host memory (e.g., DRAM), and a load operation to read the tensor from host memory. The spill operation can be inserted after the operator that uses the tensor in the first proxy layer identified in block 604. The load operation can be inserted before the operator that uses the tensor in the second proxy layer identified in block 604. The resulting IR modified with the inserted spilling operations can be used as the input to the memory allocator.

At block 608, a memory allocator can be invoked on the modified IR to perform a memory allocation process without the tensor associated with the inserted spilling operation. In other words, the memory allocator can be invoked to assign memory locations for tensors in the modified intermediate representation that have not been pre-spilled. In some implementations, the memory allocator can be a graph coloring-based allocator. The memory allocation process may include generating an interference graph without the tensor associated with the inserted spilling operation. The interference graph may include vertices representing tensors that have not been spilled, and edges connecting vertices to represent interferences between the tensors. The memory allocator can attempt to assign memory locations in the buffer memory of an accelerator to accommodate tensors that interfere with each other or have live ranges that overlap. The memory allocator may identify additional tensors to spill from the interference graph if the buffer memory cannot accommodate all overlapping live tensors. The compiler can generate machine code for the neural network model based on the modified intermediate representation and the assigned memory locations.

Figure 7:
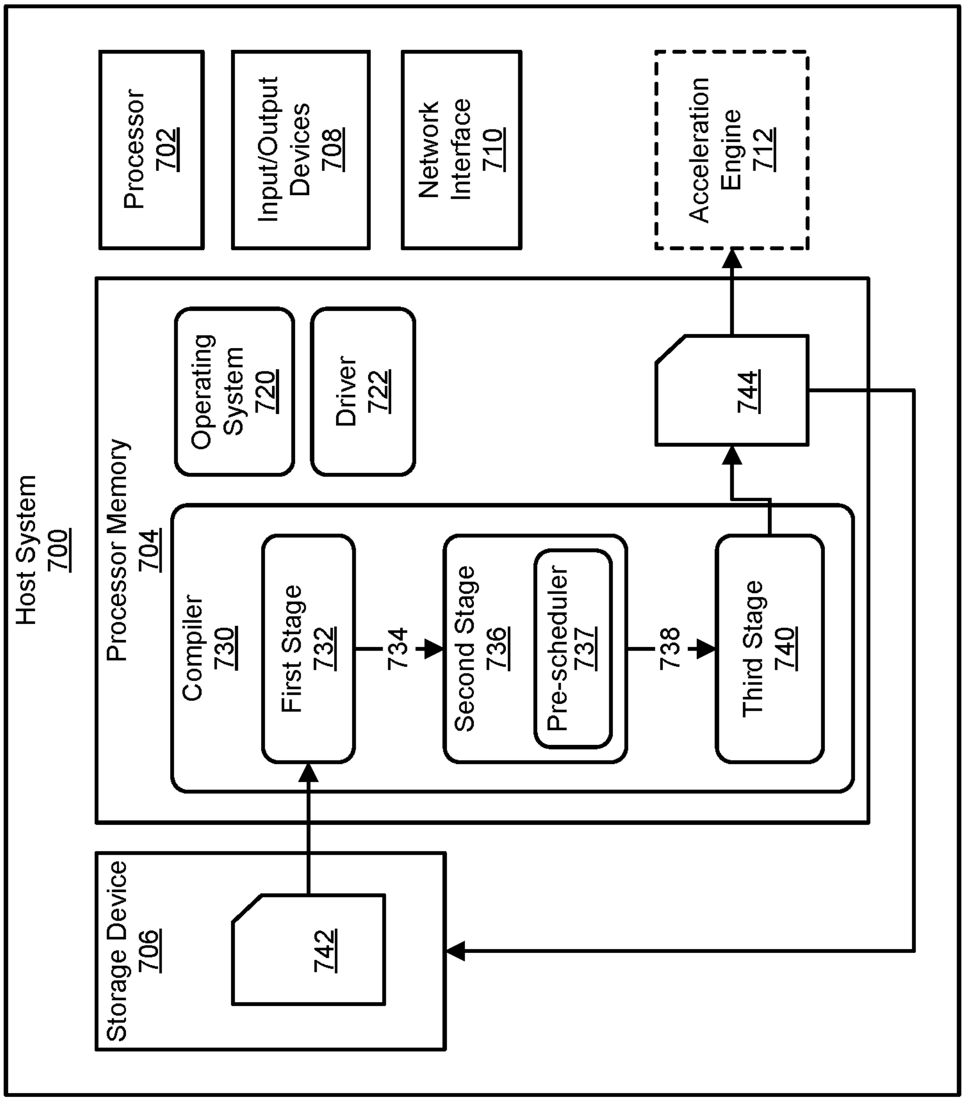
FIG. 7 illustrates a block diagram of an example of a compiler in a host system.

FIG. 7 illustrates a block diagram of an example of a host system 700 on which a compiler 730 can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which is an integrated circuit device that can accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as being performed or included in the host system 700 can be performed or included in other computer devices. For example, the compiler 730 can execute on the host system 700 while the acceleration engine 712 is located in a different host system or different computing device.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data that the processor 702 is operating on. In various examples, the processor memory 704 is a volatile memory type, such as a type of random access memory, though non-volatile memory types can, alternatively or additionally, be used for the processor memory 704.

The storage device 706 is an example of a device that can include non-volatile memory. For example, the storage device 706 can be a magnetic disk drive, a solid-state drive, or an optical drive, among other examples. Program code and other data stored on the storage device 706 can remain present when the storage device 706 is not powered on. Storage device 706 can be uses as a type of non-transitory storage medium, or may include a reader that can access non-transitory storage medium.

The storage device 706 is one example of a peripheral device. A peripheral device is a component that can be coupled to the host system 700 to add functionality to the host system 700. Other examples of peripheral devices include Input/Output devices 708 and network interface 710. The Input/Output devices 708 can include user input and/or output devices, such as keyboard, mouse, pointer, touchpad, touchscreen, microphone, display screen, speaker, printer, and scanner, among other examples. Network interface 710, which can be implemented using a network interface card, can provide access to one or more networks. Network interface 710 can include, for example, a physical port for connecting a network cable and/or one or more antennas and/or radios for wireless communication such as Wi-Fi, cellular, and/or other over-the-air networks. Network interface 710 can also be described as an I/O device.

The acceleration engine 712 is also another type of peripheral device or I/O device. The acceleration engine 712 is a device that is purpose-built to perform certain operations that can be performed by the processor 702, but can be performed faster by the acceleration engine 712. For example, the acceleration engine 712 can be a neural network accelerator that is capable of performing large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others.

In various examples, the acceleration engine 712 can execute program code to perform certain operations. For example, when the acceleration engine 712 is a neural network accelerator, the acceleration engine 712 can be programmed to execute a particular neural network model, such as one that performs image recognition or one that performs machine translation. As a further example, to support the execution of a neural network model, the acceleration engine 712 can be programed to perform operations such as copying data for the neural network between processor memory 704 and the acceleration engine 712 (e.g., copying input data for the neural network from processor memory 704 into the acceleration engine 712, copying results from the acceleration engine 712 into the processor memory 704, etc.).

To generate program code for the acceleration engine 712, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 can be a neural network accelerator, and the compiler 730 can be a compiler for compiling a neural network description into instructions to be executed by the acceleration engine 712. When the acceleration engine 712 implements a different type of accelerator, a different compiler can be used.

The compiler 730 can be activated, for example, when the operating system 720 receives keyboard, mouse, touchscreen, voice command, or other inputs from the Input/Output devices 708. The inputs can further include parameters for the compiler 730, such as input code 742 to compile and configuration options for the compilation process. Once the compiler 730 is activated, the processor 702 can load the instructions for the compiler 730 into the processor memory 704, and execute the compiler from the processor memory 704. In some implementations, compiler 730 may identifying steps to be performed by the processor 702, rather than by the acceleration engine 712. For example, the processor 702, through the execution of a driver 722, may need to perform steps such as configuring Direct Memory Access (DMA) descriptors for moving data into or out of the acceleration engine 712, among other examples.

In the example of FIG. 7, the compiler 730 includes a first stage 732, a second stage 736, and a third stage 740, which each perform different operations to produce compiled code 744. In other examples, the compiler 730 can combine the operations of the first stage 732, second stage 736, and/or third stage 740 into fewer stages, or can divide the operations of one or more of the stages into multiple stages. In some implementations, compiler 730 can also be modified such that certain operation(s) from one stage can be executed in a different stage.

The first stage 732 (may also be referred to as the front stage) can receive and process input code 742. The input code 742 can describe a program in a high-level programming language, such as Python, Java, C++, among other examples, and may utilize software libraries tailored for neural networks such as TensorFlow, PyTorch, etc. The input code 742 can be a description of a neural network model that describe, for example, steps to perform image recognition, speech recognition, machine translation, or other operations. The input code 742 can be obtained from the storage device 706. Alternatively, though not illustrated, the input code 742 can be located in the processor memory 704, or can be obtained from a network location using the network interface 710.

Processing of the input code 742 can include parsing the input code 742, performing syntax and semantic analysis on the input code 742 to identify operators (e.g., operations such as computations, memory accesses, and/or other functions, etc.) described in the input code 742, and sorting the operators described in the input code 742. For example, the operators described in the input code 742 can be sorted into layers, where the outputs of one layer provide the inputs to a next layer. The output of the first stage 732 can be an intermediate representation (IR) 734 of the input code 742. In some implementations, the IR 734 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 736 (may also be referred to as the middle-end stage) can perform intermediate processing on the IR 734 output from the first stage 732. The intermediate processing may include performing various optimizations on the IR 734. The optimizations may include target independent optimizations that are hardware agnostic, and/or target specific optimizations that are tailored for the hardware architecture executing the program of input code 742. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 712) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 712 to perform at the same time. The acceleration engine 712 may, for example, have a limited amount of local storage space for the data needed for a computation, or the computations may be more than the acceleration engine 712 can perform at one time. In such scenario, the operators of the layer or node can be broken down into smaller operations, which can fit into the acceleration engine's local memory and/or can fit into the computing capacity of the acceleration engine 712. In some implementations, a pre-scheduler 737 can be used to identify tensors for pre-spilling to reduce the burden on the subsequent memory allocation process. The output of the second stage 736 can be an optimized IR 738 such as code representing an optimized compute graph.

The third stage 740 (may also be referred to as the back-end stage) can operate on the output 738 of the second stage 736, and perform various steps before producing the instructions (e.g., machine code) that are to be executed by the acceleration engine 712. These steps can include instruction and data scheduling, register/memory allocation, and/or code generation. Instruction and data scheduling determines the order in which instructions are executed and data are processed by the acceleration engine 712, and may include low-level dependency optimization by rearranging operations to improve parallel execution, handling dependencies between nodes by inserting synchronization instructions into the code, etc. Register/memory allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 712, and includes mapping operations into hardware instructions according to the architecture of the acceleration engine 712. The output of the third stage 740 is compiled code 744, which may include machine instructions in binary format. In some examples, the compiled code 744 can be stored in the processor memory 704. Alternatively or additionally, the compiled code 744 can be copied to the storage device 706 or to a network location. As noted above, the acceleration engine 712 may be located at a different host system, in which case the compiled code 744 can be sent over the network interface 710 to the other host system.

In the example of FIG. 7, the host system 700 can be executing a driver 722, which can also be referred to as a device driver or runtime driver, that manages the acceleration engine 712. The driver 722 can provide an interface between applications executing on the host system 700 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network model that the acceleration engine 712 is to execute, as well as the location in the processor memory 704 or on the storage device 706 where the compiled code 744 for the neural network model is located. The driver 722 can further load into the acceleration engine 712 or cause the acceleration engine 712 to load the compiled code 744, can load or cause the acceleration engine 712 to load the input data on which the neural network model is to operate, and/or can cause the acceleration engine 712 to begin executing on the input data. Once the acceleration engine 712 has finished, the acceleration engine 712 can notify the driver 722, and the driver 722 can deliver a result back to the application that requested the result.

Figure 8:
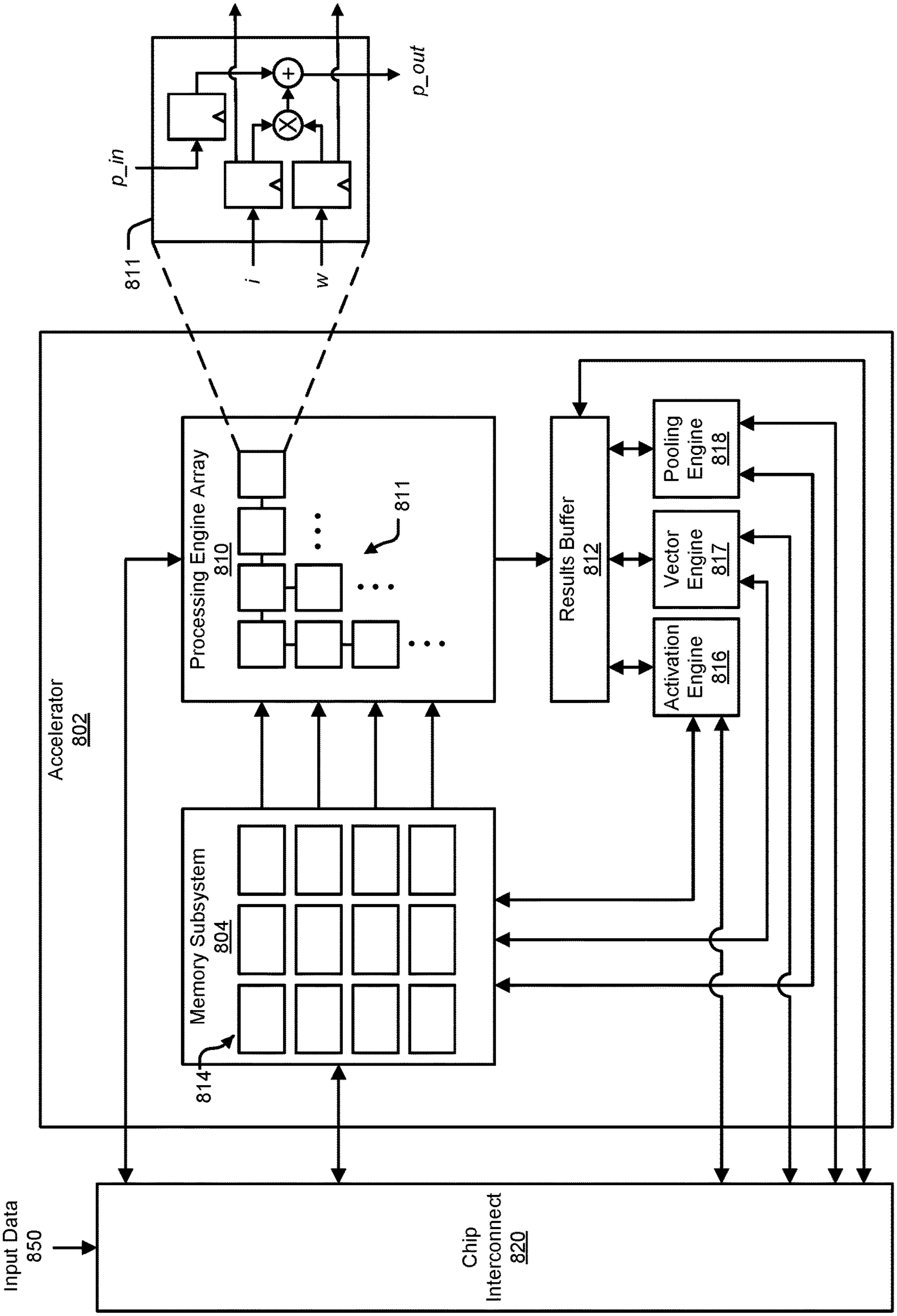
FIG. 8 illustrates a block diagram of an example of an integrated circuit device.

FIG. 8 is a block diagram illustrating an example of an integrated circuit device that can include an accelerator 802. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. Memory subsystem 804 can also be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817. Vector engine 817 is a compute engine that can perform computations and manipulations on values stored in memory subsystem 804 and/or results buffer 812 such as values representing matrices of input values, weight values, intermediate results, etc. Vector engine 817 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
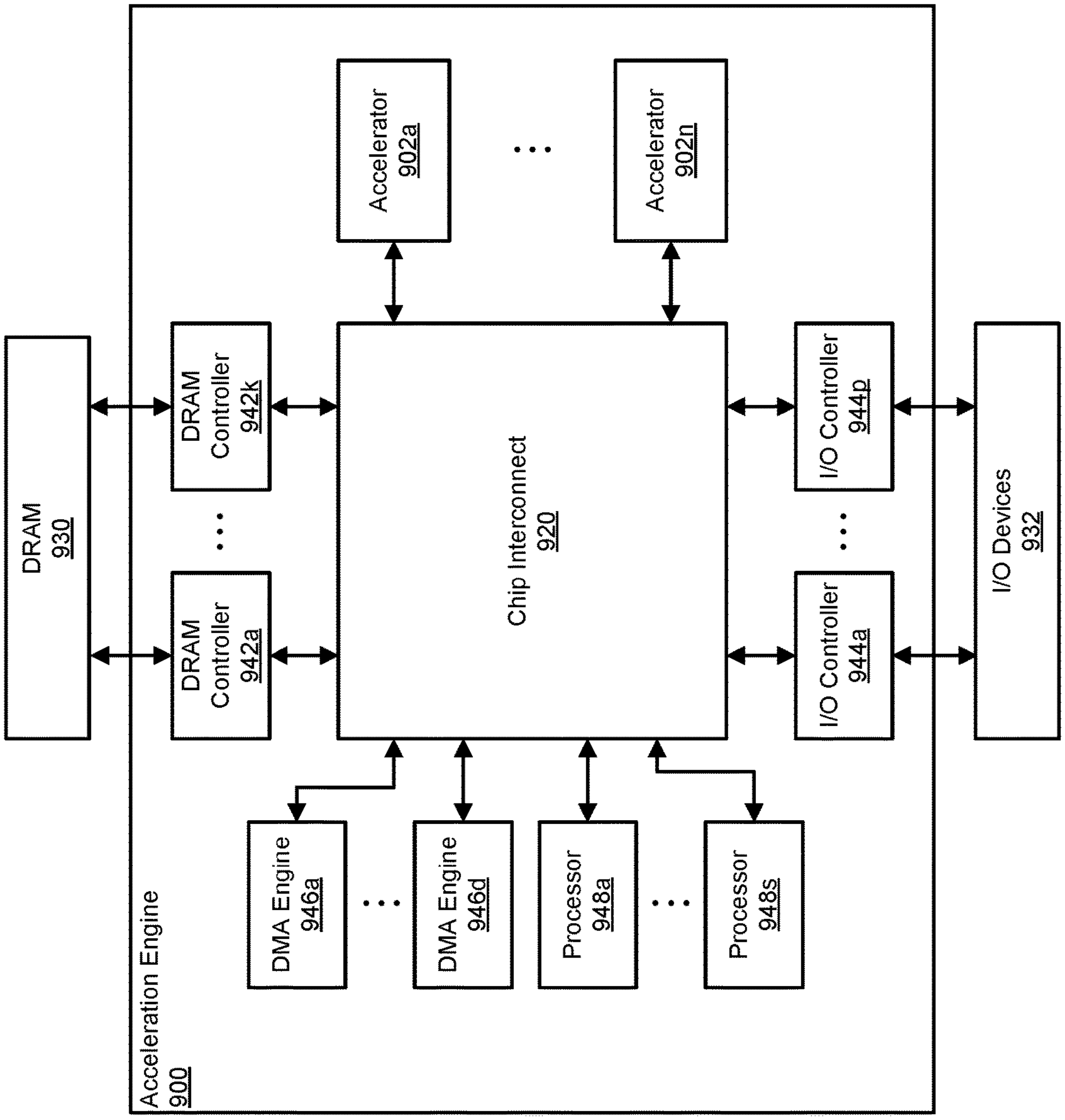
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators **902*a*-902*n* that may be similar to the accelerator illustrated in FIG. 8**.

In the example of FIG. 9, the acceleration engine 900 includes multiple accelerators **902*a*-902*n*, each of which can perform a set of operations. In various examples, the accelerators 902*a*-902*n* are for particular types of operations, so that the accelerators 902*a*-902*n* can perform the operations much faster than when similar operations are performed by a general-purpose processor. In various examples, to perform a set of operations, input data on which the operations are to be performed must first be moved into the accelerators 902*a*-902*n*. Additionally, in some cases, program code is also moved into the accelerators 902*a*-902*n*, which programs the operations that the accelerators 902*a*-902*n* will perform on the data. In the illustrated example, the acceleration engine 900 includes n accelerators 902*a*-902*n*. Examples of accelerators that can be included in the acceleration engine 900 include graphics accelerators, floating point accelerators, neural network accelerators, and others. In various examples, the accelerators 902*a*-902*n* can each be the same (e.g., each of the is a graphics accelerator) or can be different (e.g., the accelerators 902a-902**n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
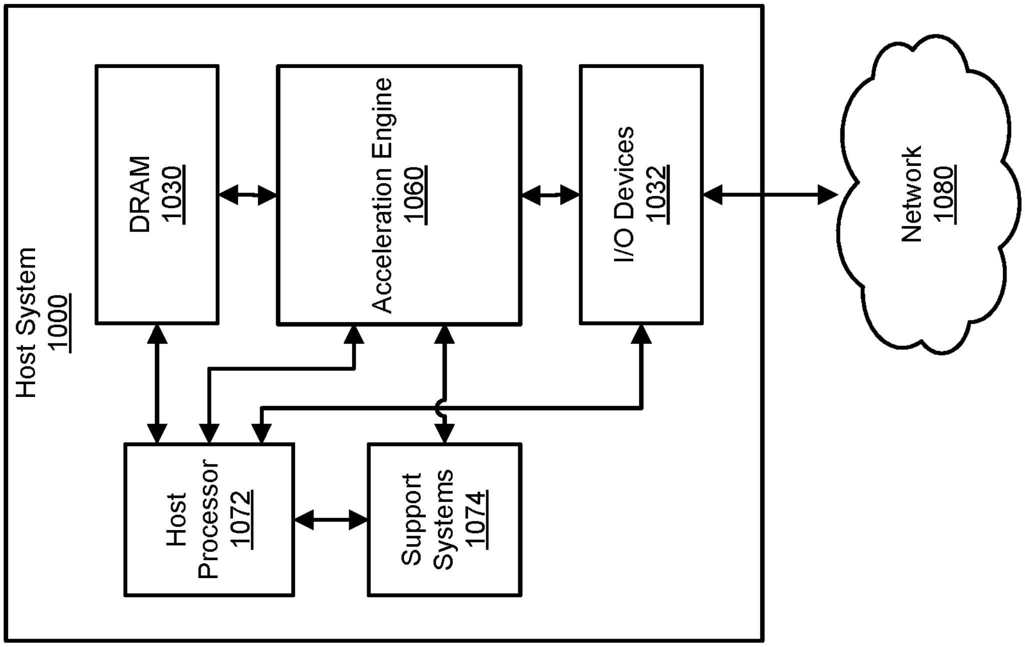
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by a compiler, the method comprising:

receiving a description of a neural network model;

generating an intermediate representation of the neural network model representing a data flow graph, the data flow graph comprising a plurality of operators;

identifying collective compute operations to identify proxy layers in the data flow graph;

determining long-distance tensors that are used sequentially in proxy layers separated by a threshold number of at least two proxy layers;

inserting spilling operations for the long-distance tensors in the intermediate representation of the neural network model to generate a modified intermediate representation;

providing the modified intermediate representation to a memory allocator to assign memory locations for tensors in the modified intermediate representation that have not been spilled; and generating machine code for the neural network model based on the modified intermediate representation and the assigned memory locations.

2. The computer-implemented method of claim 1, further comprising:

assigning sequential layer identifiers to the proxy layers.

3. The computer-implemented method of claim 1, further comprising:

identifying, by the memory allocator, additional tensors to spill.

4. The computer-implemented method of claim 1, wherein the neural network model is a transformer model.

5. A computer-implemented method, comprising:

identifying boundary markers in a representation of a neural network model to determine proxy layers in the neural network model;

determining a tensor that is used in a first proxy layer and is used next in a second proxy layer separated from the first proxy layer by a threshold distance of at least two proxy layers;

inserting a spilling operation for the tensor to remove the tensor from a memory allocation process; and invoking a memory allocator to perform the memory allocation process without the tensor associated with the inserted spilling operation.

6. The computer-implemented method of claim 5, wherein the boundary markers include a collective compute operation.

7. The computer-implemented method of claim 5, wherein the boundary markers include a batch normalization operation.

8. The computer-implemented method of claim 5, wherein the boundary markers include a boundary tag inserted by a user or by a neural network development framework.

9. The computer-implemented method of claim 5, further comprising:

assigning layer identifiers to the proxy layers.

10. The computer-implemented method of claim 9, wherein the layer identifiers are used to compute a distance between the proxy layers.

11. The computer-implemented method of claim 5, wherein the memory allocation process includes generating an interference graph without the tensor.

12. The computer-implemented method of claim 11, wherein the memory allocation process includes identifying additional tensors to spill from the interference graph.

13. The computer-implemented method of claim 5, wherein the first proxy layer is in a forward pass of a training process, and the second proxy layer is in a backward pass of the training process.

14. The computer-implemented method of claim 5, wherein the neural network model is a transformer model.

15. A non-transitory computer readable medium having stored therein instructions that, when executed by one or more processors, cause the one or more processors to execute a compiler, the compiler performing operations including:

identifying boundary markers to determine proxy layers in a representation of a neural network model to determine proxy layers in the neural network model;

determining tensors that are used sequentially in proxy layers separated by a threshold distance of at least two proxy layers;

inserting spilling operations for the tensors to remove the tensors from a memory allocation process; and invoking a memory allocator to perform the memory allocation process without the tensors associated with the inserted spilling operations.

16. The non-transitory computer readable medium of claim 15, wherein the boundary markers include one or more of a collective compute operation, a batch normalization operation, or a boundary tag inserted by a user or by a neural network development framework.

17. The non-transitory computer readable medium of claim 15, wherein the operations further include:

assigning layer identifiers to the proxy layers, wherein the layer identifiers are used for computing a distance between the proxy layers.

18. The non-transitory computer readable medium of claim 15, wherein the memory allocation process includes generating an interference graph without the tensors associated with the inserted spilling operations.

19. The non-transitory computer readable medium of claim 18, wherein the memory allocation process includes identifying additional tensors to spill from the interference graph.

20. The non-transitory computer readable medium of claim 15, wherein the threshold distance is configurable.

* * * * *